T. HÜBSCHER.
VEHICLE WHEEL.
APPLICATION FILED DEC. 29, 1908.
939,695.
Patented Nov. 9, 1909.
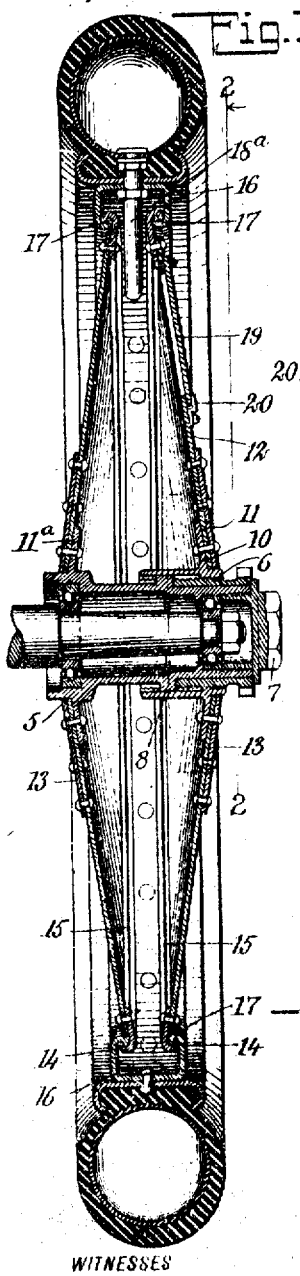
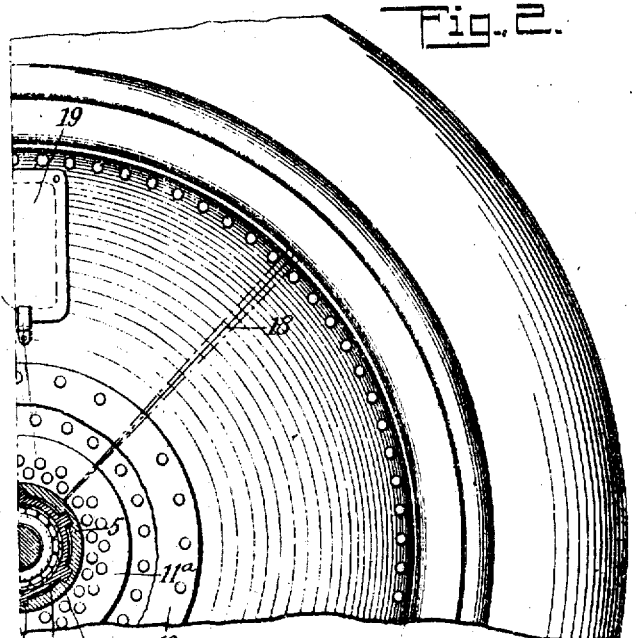
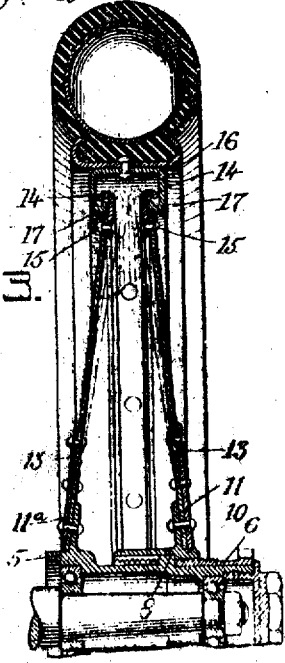
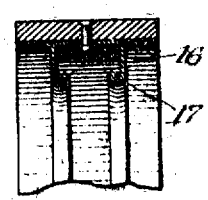
WITNESSES
INVENTOR
Traugott Hübscher
BY Munn&Co
ATTORNEYS

UNITED STATES PATENT OFFICE.

TRAUGOTT HÜBSCHER, OF WEEHAWKEN HEIGHTS, NEW JERSEY.

VEHICLE-WHEEL.

939,695.  Specification of Letters Patent.  Patented Nov. 9, 1909.

Application filed December 29, 1908. Serial No. 469,854.

*To all whom it may concern:*

Be it known that I, TRAUGOTT HÜBSCHER, a citizen of the Republic of Switzerland, and a resident of Weehawken Heights, in the county of Hudson and State of New Jersey, have invented a new and Improved Vehicle-Wheel, of which the following is a full, clear, and exact description.

The invention has in view a vehicle wheel embodying simplicity, strength and lightness of construction and offering little resistance to the air, and in which the rim, with the tire, may be readily detached and replaced, and, further, presenting few parts on which dust and dirt may collect, and protecting the tire bolts, air valve and other parts at the inside of the wheel from the weather.

To this end the invention may be generally defined as consisting of oppositely-disposed dished tension heads, forming the sides of the wheel body, connected to the hub and detachably connected to the rim or circumferential portion of the wheel.

Reference is to be had to the accompanying drawings forming a part of this specification, in which similar characters of reference indicate corresponding parts in all the views.

Figure 1 is a vertical central section through a vehicle wheel constructed in accordance with my invention; Fig. 2 is a fragmentary face view of the same partly in section on the line 2—2 of Fig. 1; Fig. 3 is a fragmentary sectional view similar to Fig. 1, showing the heads moved inwardly to releieve them of tension, as when applying the rim and attached tire; and Fig. 4 is a fragmentary sectional view illustrating the application of my improvements to a vehicle wheel having a plain iron tire.

The hub 5 of the wheel at the outer end portion has an externally threaded thimble 6 journaled thereon and held against endwise movement by a nut 7 and a rib 8, the nut closing the outer end of the hub and the rib being integral or otherwise rigid with an intermediate portion of the hub. The rib 8 is slotted at intervals to form circumferential teeth 9 which engage in correspondingly arranged grooves on the inside of a collar 10, the latter being threaded on the thimble 6, whereby it may be adjusted longitudinally of the hub, and has an external flange 11 inclining inwardly. A similar flange 11ª is integral or otherwise rigidly attached to the inner end portion of the hub, each flange being secured by rivets or other devices to a dished sheet metal head 12, that portion of each head adjacent to the flanges 11 and 11ª being reinforced by sheet metal rings 13, providing a double thickness of metal. The concave faces of the heads are arranged in opposed position, and the heads at the margins or perimeters are provided with hooks or grooves 14 opening at the outside and facing toward the hub. These hooks may be formed integrally with the heads, but I preferably construct them as separate annular members 15, and rivet or otherwise secure them on the inner faces of the heads.

To the inside of the tire is secured an annular sheet metal channel member 16 having the edges turned inwardly to form grooves or hooks 17, similar to the hooks 14, and with which the latter are adapted to engage. In order that this engagement may be easily effected, the heads are radially split as indicated at 18 in Fig. 2. That portion of the head at one side of this dividing line is sprung into the channel member 16 and the springing action continued for the whole circumference of the head, when the entire length of the hook 14 will be entered. In detaching the head from the rim and tire the reverse operation is performed. With the heads in place the thimble 6 is rotated in a direction to force the heads apart, drawing the hooks 14 well down into the hooks 17 of the channel member and placing the heads under the required tension. In the case of an automobile or similar wheel the rim will preferably be constructed of sheet metal, as illustrated in Figs. 1 to 3 inclusive, and in iron tired vehicles the channel member 16 will be applied as illustrated in Fig. 4. Extra tires carried for the vehicle may be provided with a rim and channel member, and instead of removing and replacing the tire proper, the channel member may be disconnected from the body of the wheel and the extra tire with attached rim and channel member applied without removing the tire from the rim.

In order that access may be had to the nipple 18ª for inflating the tire, I have shown one of the heads 12 provided with an opening which is normally covered by a door or closure 19, the latter being preferably hinged to swing from over the opening, and having a clip or latch 20 for securing it in operative position.

Having thus described my invention, I claim as new and desire to secure by Letters Patent.

1. A vehicle wheel having opposed dished tension heads secured to the hub and detachably connected to the rim portion of the wheel, said heads constructed to move into and out of the rim opening in applying them to and removing them from the rim, when detached.

2. The combination in a vehicle wheel, of a hub, a rim having attaching means secured thereto, opposed dished heads carried on the hub and detachably engaging said means, and means to spread the heads apart to force them into engagement with the first named means and place the heads under tension.

3. The combination in a vehicle wheel, of a rim, a channel member secured on the inner side of the rim having hooks, a hub, and opposed dished tension heads connected to the hub and having hooks at the perimeters thereof engaging with the hooks of the channel member.

4. The combination in a vehicle wheel, of a hub, a rim, a channel member secured on the inside of the rim having the edges inwardly turned to form hooks, and opposed dished tension heads connected to the hub and having outwardly-turned hooks at the margins detachably engaging in the hooks of the channel member.

5. The combination in a vehicle wheel, of inner and outer portions, opposed dished tension heads connected to the inner portion and having hooks detachably engaging with the outer portion of the wheel, said heads being radially split to permit of the springing of the hooks into and out of engaging position.

6. The combination in a vehicle wheel, of an outer wheel portion having hooks, a hub, a member adjustable longitudinally on the hub, opposed dished heads having marginal hooks adapted to engage with the first mentioned hooks, with one of the heads secured to the hub and the other head secured to said member.

7. The combination in a vehicle wheel, of a rim, a hub, opposed dished heads detachably engaged with the rim at the inside thereof and arranged on the hub, and means in connection with the hub to spread the heads apart, said heads being contractible in diameter to pass them into and remove them from the opening in the rim.

In testimony whereof I have signed my name to this specification in the presence of two subscribing witnesses.

TRAUGOTT HÜBSCHER.

Witnesses:
M. SPILLMANN,
JOHN A. KAPPELER.